United States Patent [19]

Müller

[11] 4,077,865
[45] Mar. 7, 1978

[54] CLAMPING DEVICE FOR ARTICLES TO BE ELECTROPLATED

[75] Inventor: Arthur E. Müller, Greifensee, Switzerland

[73] Assignee: Zbinden & Co., Derendingen, Switzerland

[21] Appl. No.: 747,427

[22] Filed: Dec. 3, 1976

[51] Int. Cl.² .............................................. C25D 17/06
[52] U.S. Cl. ................................ 204/297 W; 204/286
[58] Field of Search ............... 204/286, 297 W, 297 R

[56] References Cited

U.S. PATENT DOCUMENTS

| | | | |
|---|---|---|---|
| 2,177,453 | 10/1939 | Donald | 204/286 |
| 2,248,718 | 7/1941 | Owen | 204/297 R |
| 2,852,463 | 9/1958 | Gutzmer | 204/242 |
| 3,980,544 | 9/1976 | Adams et al. | 204/286 |

*Primary Examiner*—F.C. Edmundson
*Attorney, Agent, or Firm*—Dorfman, Herrell and Skillman

[57] ABSTRACT

A device having a support to be secured to a bus bar and a clamping screw driven into the support for holding an article to be electroplated in a bath. A bore is disposed in the support at an angle to the longitudinal axis of the clamping screw, and a threaded blind bore for receiving a contact screw is disposed in the bus bar. The contact screw has a continuous circumferential portion forming a contact surface which contacts the article, the support acting as a sealing means to prevent the bath solution from penetrating into the blind bore of the bus bar.

4 Claims, 2 Drawing Figures

CLAMPING DEVICE FOR ARTICLES TO BE ELECTROPLATED

This invention relates to a device for clamping an article to be electroplated to a bus bar, of the type having at least one support secured to the bus bar and a clamping screw driven into the support to hold the article.

Devices are already known for securing to a bus bar articles which are immersed in a bath together with the electroplating apparatus and to which the current necessary for the electroplating process is supplied via the bus bar. These known devices comprise at least one support which completely encircles the bus bar and is forked on at least one side, preferably on two opposite sides. In one prong of the fork there is a thread for a clamping screw, and on the inside of the other prong there is a contact surface, the article to be electroplated being clamped in between the end of the screw and the contact surface. The support is made of metal and is rigidly and conductively connected to the bus bar by means of a pin passing transversely through the latter. The portion of the bus bar which is not covered by the support, and the support itself except for the contact surface, are coated with a layer of plastic so that the device will not be attacked by chemically active substances which may be contained in the bath, and also so that no layer of metal may be deposited on the device. The clamping screw itself is made of plastic.

If the layer of plastic acting as a protective coating is in the least defective or damaged, the metal parts beneath it are attacked by the chemicals in the bath and destroyed. In order to replace a defective support, the layer of plastic must first be removed from the bus bar by mechanical or chemical means so that the support can be exchanged. After the new support has been mounted, the entire device must be re-coated with a protective layer.

It is an object of this invention to provide an improved clamping device of the type initially described which allows the individual supports to be removed and replaced withoud any special preliminary operations and which does not necessitate any renewal of the plastic coating after repairs have been carried out.

To this end, in the clamping device according to the present invention, the improvement comprises a continuous bore disposed in the support at an angle to the longitudinal axis of the clamping screw, a threaded blind bore disposed in the bus bar substantially at right angles to the longitudinal axis of the bus bar, a bearing surface formed in a portion of the support surrounding the continuous bore and adapted to bear upon a matching surface portion of the bus bar surrounding the blind bore, and a contact screw having a continuous circumferential portion forming a contact surface and a shank adapted for insertion through the continuous bore and into the blind bore.

A preferred embodiment of the invention will now be described in detail with reference to the accompanying drawing, in which.

Figure 1:
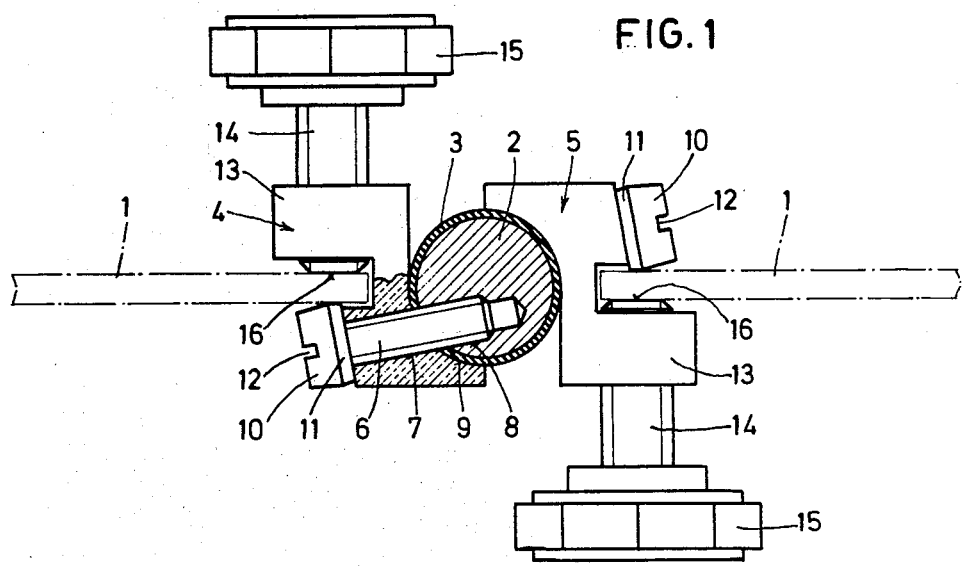
FIG. 1 is a side elevation of the clamping device, partially in section.
Figure 2:
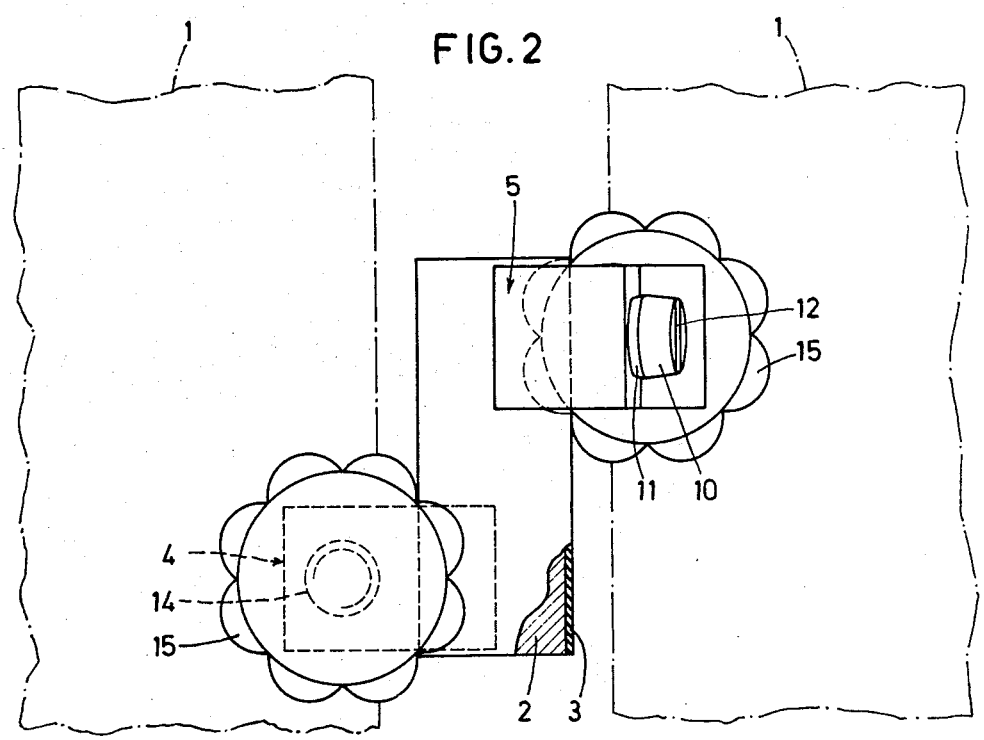
FIG. 2 is a top plan view of the clamping device of FIG. 1, also partially in section.

The embodiment of the device illustrated in FIGS. 1 and 2, intended for clamping one or more flat articles 1, comprises a bus bar 2 made of a metal which is a good electrical conductor. Bus bar 2 is covered with a protective coating 3 of plastic so that it will not be attacked by the corrosive liquid in the electroplating bath, and also so that no layer of metal will be deposited on bus bar 2 during the electroplating process. Two supports 4 and 5 are secured to bus bar 2, each by means of a contact screw 6.

Hereafter, the device will be described with reference only to support 4, it being understood that the description applies equally to support 5, the same reference numerals being used to designate identical parts in both cases.

The shank of contact screw 6 passes through a bore 7 in support 4 and is screwed into a threaded blind bore 8 in bus bar 2. By means of contact screw 6, a curved bearing surface 9 of support 4 is pressed against the area of protective coating 3 surrounding blind bore 8. As a result, the shank of contact screw 6 and blind bore 8 are completely sealed off from the outside, so that upon immersion in the bath, no liquid can penetrate to the shank or into blind bore 8, and corrosion of these parts is thus precluded.

A head 10 of contact screw 6 includes a frustoconical portion, the surface of which serves as a contact surface 11. The action of contact surface 11 is independent of the angle of rotation of contact screw 6. The remaining portion of head 10 may, as shown in FIGS. 1 and 2, be provided with a slot 12 for insertion of a screwdriver or, for example, be hexagonal in shape, so that contact screw 6 may be tightened or loosened by means of a tool. It will also be preferable to coat head 10 with a protective layer of plastic, except for contact surface 11.

In an extension 13 of support 4 situated opposite head 10 of contact screw 6, there is a tapped hole into which a clamping screw 14 is screwed. Clamping screw 14 has a relatively large head 15 which makes it possible to operate screw 14 conveniently without the aid of a tool. Flat article 1 is clamped in between the end surface 16 of the shank of clamping screw 14 and contact surface 11. Contact screw 6 then serves not only as a counterbearing for clamping screw 14, but also to establish the electrical connection between bus bar 2 and article 1 to be electroplated. Support 4 and clamping screw 14 are made of plastic and are therefore not attacked by the bath.

An acute angle is formed by the longitudinal axis of contact screw 6 and the diameter of bus bar 2 running parallel to end surface 16 of clamping screw 14. The angle of conicity of the frustoconical portion of head 10 of contact screw 6 is such that the generatrix of contact surface 11 nearest end surface 16 runs parallel to the latter, thus ensuring that article 1 is gripped firmly but gently. Since article 1, when clamped in position, extends outward in a substantially radial direction with respect to bus bar 2, the force exerted on bus bar 2 by the weight of article 1 acts ideally upon bus bar 2.

A plurality of supports such as supports 4 and 5 may be secured to bus bar 2, in which case they may be staggered along the length of bus bar 2, as shown in FIG. 2. It is also quite possible, however, to dispose two supports at opposite points of the bus bar.

A further possibility is to dispose the longitudinal axis of contact screw 6 parallel to end face 16 of clamping screw 14. Contact screw 6 will then be given a cylindrical head, the cylindrical surface of which serves as the contact surface. In this case, however, article 1, when clamped in place, will no longer be positioned symmetrically with respect to bus bar 2 and will load the latter asymmetrically.

A major advantage of the clamping device described herein as compared with known devices is that supports 4 and 5 can be easily and inexpensively replaced in the event of any defect, i.e., it is not necessary first to remove the protective coating and then to reapply it after the new support has been installed. Instead, it suffices to remove contact screw 6 from the defective support, put a new support in place, and drive contact screw 6 in again to secure the new support to the bus bar.

What is claimed is:

1. In a device for clamping an article to be electroplated to a bus bar, of the type having at least one support secured to said bus bar and a clamping screw driven into said support to hold said article, the improvement comprising:

a continuous bore disposed in said support at an angle to the longitudinal axis of said clamping screw, a threaded blind bore disposed in said bus bar substantially at right angles to the longitudinal axis of said bus bar, a bearing surface formed in a portion of said support surrounding said continuous bore and adapted to bear upon a matching surface portion of said bus surrounding said blind bore, and a contact screw having a continuous circumferential portion forming a contact surface and a shank adapted for insertion through said continuous bore and into said blind bore, said contact screw being of metal and comprising a head, said contact surface being a continuous circumferential surface portion of said head, said clamping screw including a shank having an end face, the generatrix of said circumferential surface portion nearest said end face running parallel to said end face, said bus bar being of circular cross-section, and said bearing surface being adapted to bear upon a said matching surface portion of said bus bar extending over at least one-quarter of the circumference of said bus bar.

2. The device of claim 1, wherein said support and said clamping screw are of plastic, further comprising a protective coating of plastic surrounding said bus bar.

3. The device of claim 1 for clamping a flat article to be electroplated, wherein the diameter of said bus bar running parallel to said clamping screw end face forms an acute angle with the longitudinal axis of said contact screw when said shank of said contact screw is inserted through said continuous bore and into said blind bore.

4. The device of claim 1 wherein the surface portion of said bus bar surrounding said blind bore has a continuous plastic coating therein, and the bearing surface of said support conforms to the plastic-coated surface of said bus bar to act as a sealing means to prevent electroplating solution from penetrating into said blind bore.

* * * * *